(12) United States Patent
Carter et al.

(10) Patent No.: US 6,800,260 B2
(45) Date of Patent: Oct. 5, 2004

(54) PROCESSES FOR TREATING IRON-CONTAINING WASTE STREAMS

(75) Inventors: Peter Carter, North East Lincolnshire (GB); Christopher John Davis, North Lincolnshire (GB); Michael Robinson, Lincolnshire (GB); Kirit Talati, North Lincolnshire (GB)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 303 days.

(21) Appl. No.: 10/073,655

(22) Filed: Feb. 11, 2002

(65) Prior Publication Data

US 2003/0150818 A1 Aug. 14, 2003

(51) Int. Cl.⁷ .......................... C01G 49/00; C01G 45/00; C01G 37/00; C01G 33/00; C01F 11/00
(52) U.S. Cl. ................ 423/140; 423/142; 423/144; 423/166; 423/50; 423/55; 423/65; 423/66; 423/85; 423/122; 423/127; 423/129; 423/158; 423/164; 423/165; 423/339
(58) Field of Search ................ 423/140, 142, 423/144, 166, 50, 55, 65, 66, 85, 122, 127, 129, 158, 164, 165, 339

(56) References Cited

U.S. PATENT DOCUMENTS

| | | |
|---|---|---|
| 3,016,286 A | 1/1962 | Masukawa et al. |
| 3,931,007 A | 1/1976 | Sugano et al. |
| 4,119,536 A | 10/1978 | Iwase et al. |
| 4,261,966 A | 4/1981 | Portes et al. |
| 4,382,822 A | 5/1983 | Mayer |
| 4,620,879 A | 11/1986 | Burow et al. |
| 4,698,100 A | 10/1987 | Burow et al. |
| 4,701,221 A | 10/1987 | Brunn et al. |
| 4,702,776 A | 10/1987 | Hoffner et al. |
| 5,032,180 A | 7/1991 | Kröckert et al. |
| 5,185,141 A | 2/1993 | Kröckert et al. |
| 5,282,977 A | 2/1994 | Schinkitz |
| 5,407,650 A | 4/1995 | Hartmann et al. |
| 5,518,633 A | 5/1996 | Brown et al. |
| 5,686,378 A * | 11/1997 | Katamoto .................. 502/338 |
| 5,916,360 A | 6/1999 | Braun et al. |
| 6,042,642 A | 3/2000 | Braun et al. |
| 6,117,228 A | 9/2000 | Burow et al. |
| 6,179,908 B1 | 1/2001 | Braun et al. |
| 6,274,045 B1 | 8/2001 | Kreisler |

FOREIGN PATENT DOCUMENTS

| | | |
|---|---|---|
| GB | 814688 | 10/1959 |
| GB | 2040904 A | 3/1980 |

OTHER PUBLICATIONS

Annex to Form PCT/ISA/206, Communication Relating to the Results of the Partial International Search, Jul. 25, 2003.
PCT International Search Report, European Patent Office, Oct. 24, 2003.

* cited by examiner

Primary Examiner—Steven Bos
(74) Attorney, Agent, or Firm—Kalow & Springut LLP; Scott D. Locke, Esq.

(57) ABSTRACT

Processes for treating iron containing waste streams are provided. According to these processes, metal-containing compounds, particularly iron oxides are produced. These methods may, for example, be used in the processing of the waste streams from the chlorination of titanium-bearing raw materials and involve the use of certain combinations of neutralization and precipitation steps.

43 Claims, 3 Drawing Sheets

PROCESSES FOR TREATING IRON-CONTAINING WASTE STREAMS

BACKGROUND OF THE INVENTION

The present invention relates to processes for treating iron-containing waste streams. More particularly, this invention relates to treating waste streams that arise from the chlorination of certain raw materials that contain titanium, and producing metal compounds from these waste streams.

Titanium ores and slags, as well as other sources of titanium typically contain many elements other than titanium itself. In order to obtain useful titanium products from these sources, generally one must remove or substantially reduce the amount of these other elements. These other elements may be referred to as "impurities." By way of example, these impurities may contain one or more of the following substances: iron, manganese, chromium, vanadium, aluminum, niobium, magnesium, silicon, zirconium and calcium.

One method for treating titanium ores, slags and other sources of titanium is the chloride process. This process, which involves the chlorination of titanium-bearing raw materials to form titanium chloride, and the oxidation of that substance to form titanium dioxide, is well known to persons skilled in the art. When materials that contain a selection of the aforementioned impurities are subjected to the chloride process, chlorides of these elements, as well as some oxychlorides may be generated.

Another method for treating titanium-bearing raw materials is the sulfate process. In this process, titanium bearing raw materials are dissolved in sulfuric acid to form titanyl sulfate, which in turn is subjected to hydrolysis and calcination to form titanium dioxide. The sulfate process is also well known to persons skilled in the art.

Historically, in the chloride process, after chlorination, the chlorinated impurities have been separated from the titanium chloride, and they have been treated as waste. For example, some processes have disposed of these impurities in landfills after they have been treated with lime or other suitable alkali substances to generate disposable precipitates. However, with increasing environmental regulation and decreasing availability of landfills, there has been a movement to find uses for the impurities, as well as to develop methods under which to render them useful.

One of the impurities that is found in sources of titanium is iron in the form of iron oxides. Many raw materials that contain titanium and a significant amount of iron oxides also contain relatively minor amounts of the other aforementioned impurities. For example, Norwegian rock ilmenite, (which is exclusively used in the sulfate process,) contains approximately 44 wt. % titanium dioxide, approximately 45 wt. % iron oxide and also approximately 0.3 wt. % MnO, approximately 0.08 wt. % $Cr_2O_3$, and approximately 0.2 wt. % $V_2O_5$. When this type of ore is processed, the iron bearing stream contains lower levels of other impurity materials than would be produced from a higher grade $TiO_2$ ore. Thus, it is not surprising that a body of knowledge exists on the manufacture of iron oxide particles from the by-product or waste streams from such a process.

A typical beach sand ilmenite (which may be used in the sulfate process as at least part of the raw material, and may also be used as at least part of the raw material fed to a chloride process,) contains from about 55 wt. % to about 60 wt. % titanium dioxide; from about 33 wt. % to about 38 wt. % iron oxide; from about 1 wt. % to about 1.5 wt. % MnO; from about 0.04 wt. % to about 0.15 wt. % $Cr_2O_3$; and about 0.15 wt. % $V_2O_5$. Although the iron bearing stream from such a process is a little richer in the other impurity materials than in the case above, ways and means also exist for the preparation of iron oxide particles from these sources of titanium.

One known method for obtaining iron oxide particles from iron chloride solutions generated during the chloride process for the production of titanium dioxide uses excess chlorine in the chlorination step in order to generate a substantial percentage of iron (III) chloride. This chlorinated material is then subjected to successive condensing and separating process units that are operated at various temperatures. The somewhat purified iron (III) chloride that is recovered may then be reduced to iron (II) chloride, which can subsequently be treated to generate iron oxide particles. Because of the time and resources needed to accomplish these steps, this method may be undesirably cumbersome.

The recovery of iron oxide pigments from relatively pure iron chloride solutions, such as iron chloride solutions that are generated when certain titanium bearing ores that contain iron are subjected to hydrochloric acid leaching processes is also known in the art. These iron chloride solutions contain iron in the form of iron (II) chloride and may also be generated as spent hydrochloric acid liquor resulting from the manufacture of synthetic rutile from ilmenite or possibly of upgraded slag from titanium dioxide slag. However, as described below, the known methods for recovery of iron oxide pigments from these solutions all suffer from certain limitations, particularly when applied to less pure iron chloride solutions.

Under one known process for recovering iron (II) chloride from certain waste streams, various pH adjustments are first performed to remove metal chlorides other than iron (II) chlorides by the addition of a calcium containing alkali. Calcium-based alkali is used because it is cheap, and there is a readily available supply of it. According to this process, the iron (II) chlorides are then recovered and subsequently oxidized. These relatively simple methods are possible when one begins with an iron (II) chloride solution that is fairly pure. However, with an iron-containing stream that also contains a significant level of other impurities, a large amount of calcium must be introduced, which hampers further downstream processing. Consequently, these methods are not effective with poor quality chloride streams (in terms of iron content) such as the effluent stream from a standard chloride titanium dioxide process that uses natural or synthetic rutile titanium dioxide slag, and/or upgraded titanium dioxide slag or other beneficiated ores that contain titanium dioxide, such as upgraded anatase ore, where the titanium dioxide content is greater than 80 wt. % as fed into the chlorinator.

Other sources of iron-containing waste streams may arise from chloride-grade titanium slags, which typically contain approximately 86 wt. % $TiO_2$ and approximately 10 wt. % FeO. Titanium slags may also contain approximately 1.6 wt. % MnO, approximately 0.1 wt. % $Cr_2O_3$ and approximately 0.4 wt. % $V_2O_5$. The impurity content of the iron-containing stream from such a material is considerably greater than those discussed previously. Because of the significant concentration of iron, it is particularly desirable to develop commercial ways to treat these waste streams. However, because of the relatively high percentage of other impurities relative to the iron, it is important to develop means to separate and to recover the iron compounds effectively. The present invention is particularly useful in connection with iron-containing waste streams derived from this type of source.

In addition to removing iron compounds from waste streams, it is also desirable to be able to control the form of the iron products that are retrieved. For example, the production of iron oxide pigments such as the yellow iron oxide known as Goethite or alpha-FeO(OH) from iron sulfate solutions such as those generated via the sulfuric acid process is one well known option for reducing waste that is generated during the production of $TiO_2$ and for generating iron oxide pigments. In that process, titanium containing ore such as Norwegian ilmenite, is subjected to the sulfate process, which will generate spent sulfuric acid liquor that contains iron sulfate in solution. This iron sulfate may be treated and recovered to generate alpha-FeO(OH). However, that process is not useful for ilmenite ores that contain higher levels of certain impurities such as manganese, chromium, and vanadium.

Thus, there remains a need to develop a cost-effective process for treating chlorination streams that contain relativity low amounts of iron relative to other impurities, and to retrieve useable iron containing products from these streams. The present invention provides a solution to this problem.

SUMMARY OF THE INVENTION

The present invention provides methods for treating iron-containing waste streams and generating metal-containing compounds such as iron oxide and manganese oxide from such raw materials. According to the present invention, waste streams from the processing of titanium raw materials by the chloride process are subjected to successive neutralization and precipitation steps in order to recover the iron compounds selectively, without accompanying these with significant levels of alkali or alkaline earth metal compounds. These iron compounds are then subjected to the oxidation, neutralization and precipitation steps that convert the iron chloride into iron-containing compounds, such as iron oxide. Following the production of the iron-containing compounds, one may also generate manganese-containing compounds such as manganese oxide.

Under one embodiment, the present invention provides a process for treating an iron-containing waste stream that is a liquid slurry stream and producing an iron-containing compound. The process comprises the steps of:

a. adding an initial neutralization agent to a liquid slurry stream to form a first precipitate and a first liquid phase, wherein said liquid slurry stream comprises an iron (II) chloride;

b. combining said first liquid phase and a sulfate-containing compound to form a second precipitate and a second liquid phase, wherein said second precipitate comprises gypsum and said second liquid phase comprises iron (II) chloride;

c. separating said second precipitate from said second liquid phase; and d. subjecting said second liquid phase to an oxidation, neutralization and precipitation process to form an iron-containing compound and a residual liquid phase.

According to this embodiment, known as the "series process," the first precipitate may be separated from the first liquid phase prior to combining the first liquid phase and sulfate-containing compound, or the first precipitate may be separated at a later time, such as when the second precipitate is separated. In the series process, preferably the initial neutralization agent is a calcium-containing neutralization agent.

Under a second embodiment, another process for treating an iron-containing waste stream is provided. This process comprises the steps of:

a. dividing a liquid slurry stream into a first slurry stream and a second slurry stream, wherein said liquid slurry stream comprises iron (II) chloride;

b. adding a calcium-containing neutralization agent to said first slurry stream to form a metal hydroxide-containing precipitate and a calcium chloride-containing liquid phase;

c. separating a majority of said calcium chloride-containing liquid phase from the metal hydroxide-containing precipitate and a minority of said calcium chloride-containing liquid phase;

d. adding said metal hydroxide-containing precipitate and said minority of said calcium chloride-containing liquid phase to said second slurry stream to form a first precipitate and a first liquid phase;

e. separating said first precipitate from said first liquid phase; and f. subjecting said first liquid phase to an oxidation, neutralization and precipitation process to form an iron-containing compound and a residual liquid phase.

According to this embodiment, known as the "parallel process," a sulfate-containing compound may optionally be added at various points in the process in order to facilitate processing by aiding in the removal of calcium. If the sulfate-containing compound is added to the first liquid phase, the first precipitate may optionally be separated from the first liquid phase prior to combining the first liquid phase with the sulfate-containing compound. Alternatively, the first precipitate does not need to be separated from the first liquid phase prior to the addition of the sulfate-containing compound, and both precipitates may be separated during step (e). Under the latter method, the first precipitate may be separated from a second liquid phase either individually or at the same time that a second precipitate is separated from the second liquid phase.

Under a third embodiment, a process is provided for treating an iron-containing waste stream from a liquid slurry stream that comprises the steps of:

a. adding an initial neutralization agent to a liquid slurry stream to form a first precipitate and a first liquid phase, wherein said liquid slurry stream comprises an iron (II) chloride;

b. dividing said first liquid phase into a first solution and a second solution;

c. adding a calcium-containing neutralization agent to said first solution to form a metal hydroxide-containing precipitate and a calcium chloride-containing liquid phase;

d. using said metal hydroxide-containing precipitate and a minority of said calcium-chloride containing liquid phase as said initial neutralization agent; and e. subjecting said second solution to an oxidation, neutralization and precipitate process to form an iron-containing compound and a residual liquid phase.

As with the second embodiment, in this embodiment, which is known as the "recycle process," a sulfate-containing compound may optionally be added at various points in the process.

All of the aforementioned processes offer the benefit of the ability to increase the recovery of useful iron products and to generate higher purity waste liquids.

DETAILED DESCRIPTION OF THE INVENTION

Figure 1:
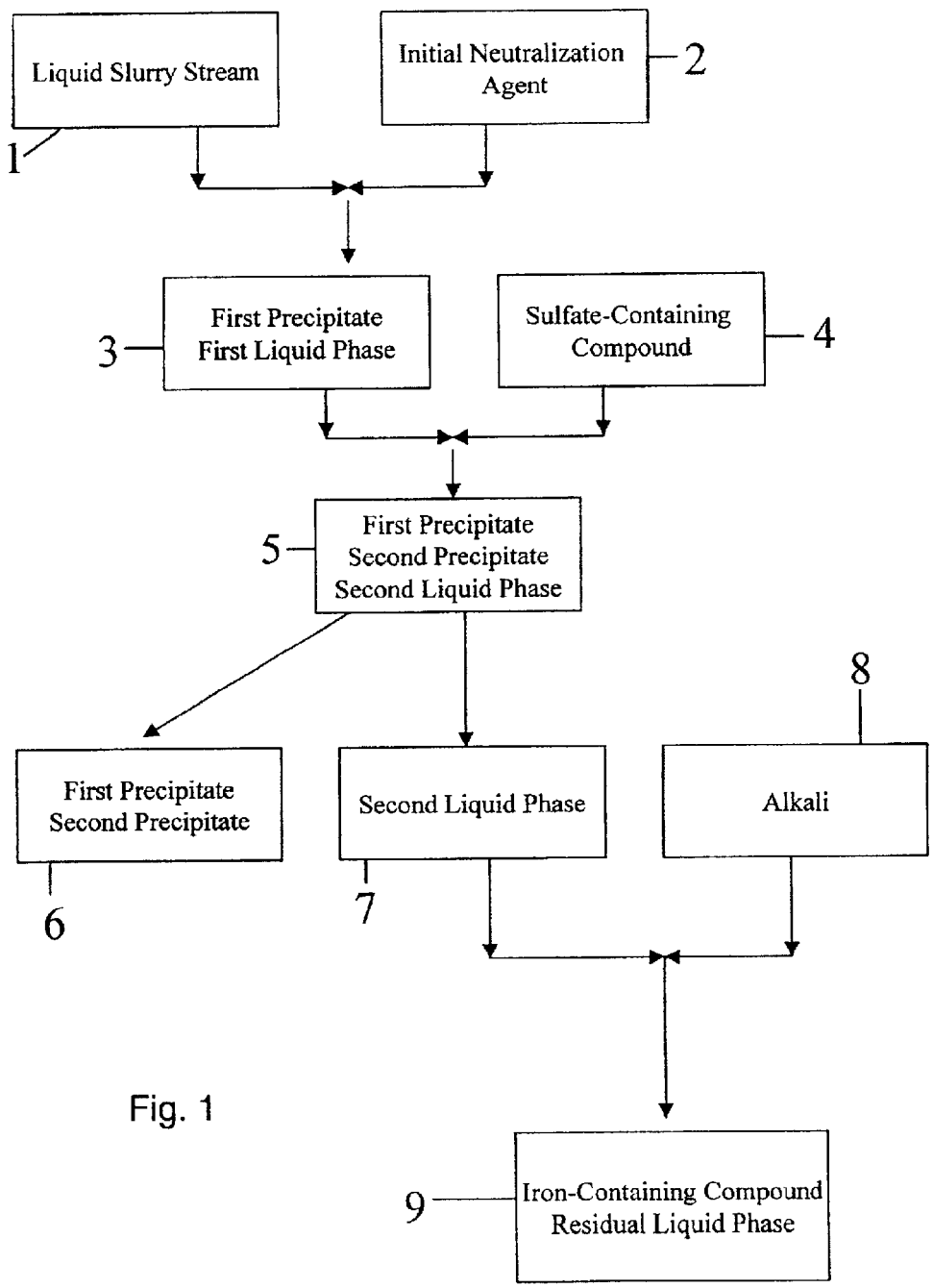
FIG. 1 is a representation of an example of the series process for producing iron-containing compounds.

The present invention provides processes for treating iron-containing waste streams. According to these processes, a liquid slurry stream that contains iron (II) chloride and typically manganese chloride as well, is treated to neutralization and precipitation steps that permit the removal of impurity metals, without significantly increasing the level of alkali or alkaline earth metals therein. Following the removal of these impurities, one may recover iron-containing compounds. In addition to the recovery of the iron-containing compounds such as iron oxide, one may recover manganese-containing compounds.

The present disclosure is not intended to be a treatise on the treatment of liquid slurry streams or methods of precipitation of metal hydroxides or metal oxides. Readers are referred to appropriate, available texts and other materials in the field for additional and detailed information on any aspect of practicing this invention.

According to the present invention, one begins with a liquid slurry stream that contains metal chlorides. The phrase "liquid slurry stream" refers to any solution, mixture or suspension that contains iron (II) chloride. The liquid slurry stream will preferably be formed as the result of the chlorination of an iron-containing substance. The phrase "iron-containing substance" refers to a substance that contains iron in its metallic or oxide form.

The liquid slurry will typically be the by-product or waste water stream that is generated during the chlorination of a titanium-containing substance. The phrase "titanium-containing substance" refers to a substance that contains titanium in its metallic or oxide form. The titanium-containing substances that generate the waste water streams to be treated by the processes of the present invention also contain iron. For example, the titanium-containing substance may be a titanium bearing ore or a slag. In addition to containing titanium and iron, these titanium-containing substances may also contain one or more other metals. Examples of these metals include but are not limited to manganese, chromium, vanadium, aluminum, niobium, magnesium, calcium, silicon, and zirconium. The present invention is not limited to the processing of any particular ore or slag that contains titanium and iron.

When the gaseous metal chlorides stream is obtained from the chlorination of a titanium-containing substance, it is necessary to separate as much as possible, the chlorinated titanium that will be used in connection with the production of $TiO_2$ products prior to isolating the iron-containing compounds. The methods for separating useable chlorinated titanium-containing substances are well known to persons skilled in the art.

Likewise, unreacted residual particles of ore and coke are recovered to the extent practical for recycle to the chlorinator.

Once the useable and recoverable chlorinated titanium-containing substances are removed, one is left with chlorinated impurities or the residual chlorination products. These chlorination products may comprise the liquid slurry stream.

As described above, one of the components of the liquid slurry stream will be iron. Preferably, substantially all of the iron in the liquid slurry stream will be iron (II) chloride. The present invention is not limited to any particular concentration of iron chloride in the liquid slurry stream. However, preferably the liquid slurry stream will be as concentrated as possible in terms of the iron chloride. A higher concentration will improve the economics of installation, for example the pump and piping size.

Typically, the liquid slurry stream will also contain the chlorides and oxychlorides of other metals. Examples of these chlorides and oxychlorides include, but are not limited to, the chlorides and oxychlorides of titanium, manganese, chromium, vanadium, aluminum, niobium, magnesium, calcium, silicon and zirconium. The titanium in the liquid slurry stream will typically be residual titanium. As previously discussed, most if not all of the titanium will preferably already have been removed so that it may be processed separately.

According to the present invention, the liquid slurry stream that is the feed stream may be subject to one of three process that are referred to herein as the series process, the parallel process and the recycle process.

According to the series process, a sub-embodiment of which is reflected in FIG. 1, an initial neutralization agent, 2, is added to the liquid slurry stream, 1. The terms "added" and "adding" refer to any methods and ordering of steps of addition that are either now known or that come to be known to persons skilled in the art for combining a substance that is used to neutralize another substance with the substance that it is intended to neutralize, and that from reading this disclosure, it becomes apparent will be useful in connection with the present invention for combining one substance with another substance. Preferably, the step of adding is accompanied by stirring or otherwise mixing the substance to be added and the substance to which it is to be added.

The initial neutralization agent is preferably but not necessarily a calcium-containing substance. A calcium-containing substance is preferred for economic reasons. Calcium-containing substances tend to be relatively inexpensive, though relatively pure, and the cakes that they form when the precipitates are filtered, are relatively easily retrieved. The phrase "calcium-containing substance" refers to a substance that contains calcium and that is useful for neutralizing solutions that contain metal chlorides. In the series process, the initial neutralization agent is more preferably selected from the group consisting of calcium hydroxide, calcium oxide, calcium carbonate and mixture thereof. The amount of the initial neutralization agent that one uses will easily be determined by persons skilled in the art and in part be dependent on the amount and character of the material sought to be neutralized.

The pH of the liquid slurry stream prior to the addition of the initial neutralization agent depends on how the liquid slurry stream is generated. It may, for example be between about pH 1.5 and pH 2.5 as when salts and blow-over solids, e.g., ore and coke, come out of the chloride process chlorinator and are slurried in liquid during the production of titanium dioxide.

The addition of the initial neutralization agent will preferably change the pH of the liquid slurry stream to a pH of between about pH 4.0 and about pH 4.5. This reflects the pH after the addition of any neutralization agent and prior to the removal of any substances from the liquid slurry stream.

The addition of the initial neutralization agent to the liquid slurry stream will yield a first precipitate and first liquid phase, 3. The phrase "first precipitate" refers to substances that contain metals contained in the liquid slurry that are capable of precipitating when the pH is changed to a pH of between about pH 4.0 and about pH 4.5, and any inert solids. For example, if the liquid slurry contained the chlorides of Al, V, Cr, and/or Nb, the first precipitate may contain the hydroxides of these metals. In practice, due to practical limitations, the first precipitate may also contain small amounts of the hydroxides of metals from the liquid slurry stream that typically precipitate at higher pHs. In the series process, the phrase "first liquid phase" refers to the substances that were part of the liquid stream and that were not precipitated to form the first precipitate.

Following the formation of the first precipitate and the first liquid phase, the first liquid phase is combined with a sulfate-containing compound, 4. The terms "combined" and "combining" refer to any methods that are either now known or come to be known to persons skilled in the art for introducing substances to be combined with each other. Combining may be accompanied by stirring or otherwise mixing the substances to be combined.

The phrase "sulfate-containing compound" refers to any substance that contains sulfate moieties and that from reading this disclosure it becomes apparent to one skilled in the art would be useful to precipitate calcium as gypsum to form the second precipitate. Preferably, the sulfate-containing compound is selected from the group consisting of ammonium sulfate, iron sulfate, sodium sulfate and mixtures thereof. More preferably, the sulfate-containing compound will be iron sulfate. Sulfate-containing compounds may be generated de novo or obtained from well-known commercial sources such as Huntsman-Tioxide. Surprisingly, even though commercial sources often have impurities that render them not useful in many processes, in the present invention, these impurities did not affect the final product. Also, elevating the temperature during addition of the sulfate-containing compound surprisingly did not affect the final product. The amount of sulfate-containing compound that should be added will depend in part on the starting materials and the amount of gypsum that one wants to generate. However, it has been realized that in all of the processes of the present invention the use of a sulfate-containing compound in an amount approximately 20% in excess of the stoichiometric amount to react with the calcium values is particularly beneficial. Whenever sulfate is added, it is preferable to filter the precipitate within one-half an hour of the addition.

Prior to the addition of the sulfate-containing compound, one may optionally remove the first precipitate (not shown in FIG. 1). The choice to remove the first precipitate is largely determined by economic factors such as the amount of gypsum present and the demand for it in the market place. Methods for separating a precipitate from the liquid phase out of which it has been precipitated are well known to persons skilled in the art and by way of example include, but are not limited to, decanting, pouring, filtering and centrifuging.

Following the combining of the first liquid phase with the sulfate-containing compound, a second precipitate and a second liquid phase are formed, 5. Also present will be the first precipitate if it has not previously been removed. The second precipitate will contain gypsum, which may be represented by the formula $CaSO_4 \cdot 2H_2O$. By precipitating gypsum, calcium is removed from the first liquid phase. By removing the calcium prior to the formation of the iron-containing compound and manganese-containing compound described below, the calcium is precluded from interfering in the formation of those compounds. Further, by removing calcium in the form of gypsum, no significant amount of sulfate ions are added to the liquid phase.

The second liquid phase will contain the bulk of the iron (II) chloride and any other species that are soluble at that pH. However, some losses are inevitably incurred during the separation process(es). The amount of the iron (II) chloride that remains in the second liquid phase is preferably as large a percentage of the starting iron (II) chloride as is possible and is referred to herein as "a portion of the iron (II) chloride."

If there were either a manganese-containing substance or a magnesium-containing substance in the initial slurry stream, chlorides of these substances would also be present in the second liquid phase.

Following the formation of the second liquid phase and the second precipitate, the second precipitate (and the first precipitate if it has not already been removed,) is separated from the second liquid phase, 6 and 7, respectively. Methods useful for separating precipitates from liquid phases are well known to persons skilled in the art and any methods that after reading this disclosure it becomes apparent will be useful in the present invention may be used. If the first precipitate is to be removed from the second liquid phase because it has not previously been removed, it may be removed in combination with the second precipitate.

Following the removal of the second precipitate and the first precipitate, if it has not already been removed, the second liquid phase is subject to an oxidation, neutralization and precipitation process that is capable of precipitating an iron-containing compound from the second liquid phase. The oxidation, neutralization and precipitation process will transform the iron (II) chloride into an iron-containing compound, which will preferably be an oxide or hydrated oxide of either iron or iron in combination with another metal, which will precipitate out of the second liquid phase, leaving a residual liquid phase, 9.

The iron-containing compound that has been oxidized, neutralized and precipitated may be recovered from the second liquid phase by any means known to persons skilled in the art for separating precipitates from liquid phases. Examples of these methods include the methods described above for separating precipitates from liquid phases. These iron-containing compounds may then be processed by methods that are either now known or that come to be known to persons skilled in the art for preparing iron oxide products such as pigments from precipitates.

Methods for oxidation, neutralization and precipitation of iron-containing compounds from a solution are well known to persons skilled in the art, such as the so-called Martin method. These methods may include, for example, the addition of alkali such as, sodium hydroxide or sodium carbonate, and ammonia or ammonium carbonate, 8. The methods for oxidation, neutralization and precipitation may be controlled in order to generate different iron-containing compounds. For example, depending on the precise details, including the use of seed in the method chosen, one may generate: $\alpha$-FeO(OH), $\beta$-FeO(OH), or $\gamma$-FeO(OH) or combinations thereof. $\alpha$-FeO(OH), $\beta$-FeO(OH) and $\gamma$-FeO(OH) may also be written as $Fe_2O_3 \cdot H_2O$ or referred to as hydrated iron oxide.

$\alpha$-FeO(OH) is also referred to as Goethite and is a light yellow to light green substance. According to the present invention, $\alpha$-FeO(OH) is preferably made by maintaining the second liquid phase at a temperature of from about 70° C. to about 80° C., bubbling air or other oxidizing gas, and adding a seed material and alkali so that the pH is maintained in the range of about pH 3.0 to about pH 4.5. The seed may be made from commercial iron sulfate and a 15%–20% caustic soda solution, and is mainly goethite with a little lepidocrocite. Other methods for producing α-FeO(OH) are well known to persons skilled in the art.

β-FeO(OH) is also referred to as Akaganeite or Akagenite and is a dull red/brown colored material. It may, for example, be produced according to the present invention without any seed material, and preferably be formed by oxidization with air at ambient temperature or higher, in the presence of a suitable base, such as sodium hydroxide, sodium carbonate or ammonium carbonate controlling the pH as above. Thus, production of β-FeO(OH) from iron chloride solutions is also well know to persons skilled in the art.

γ-FeO(OH) is also called Lepidocrocite and is a warm light orange color. The production of γ-FeO(OH) is typically difficult. According to the present invention, it may be produced by maintaining the temperature of the second liquid phase at greater than about 40° C. and using an alkali such as sodium carbonate controlling the pH as above in the presence of a seed. Here the seed may be made from pure iron chloride, a 4% caustic soda solution and is mainly Lepidocrocite with a little Goethite.

It has traditionally been thought that sodium carbonate could not be used to generate Lepidocrocite. But surprisingly, it has been found to work with the present invention. When using sodium carbonate, the resultant slurry may be filtered without the use of a flocculent. Lepidocrocite may also be made by using other alkalis such as NaOH without the use of a seed. When using NaOH, it is preferable to maintain the temperature between about 45° C. and about 50° C.; however, with the use of NaOH, the separation step is more difficult to carry out and the solids are not easily handled. The particular temperature to use for a given base is readily determinable to persons skilled in the art. Thus, production of γ-FeO(OH) via the methods of the current invention is particularly beneficial.

Other iron oxide particles may also be made. For example, FeO(OH) particles made according to the present invention may be converted into Haematite or Hematite $Fe_2O_3$, which is a red iron oxide, by heat treatment methods, which are well known to persons skilled in the art. The Haematite or Hematite particles that are generated may be associated with other particles such as MnO, so as to form precursor material for the production of ferrites.

According to the present invention, it is also possible to generate compounds such as $Fe_3O_4$, which is a black magnetic iron oxide. These compounds may be maintained by aerating the iron chloride at a weakly alkaline pH such as 1 molar NaOH between about pH 8.0 and about pH 8.5.

Preferably, between about 50% and about 80% of the iron that is present in the form of iron (II) chloride that is present in the second liquid phase is oxidized, neutralized and precipitated to form an iron-containing compound. When a greater amount of the iron is oxidized, neutralized and precipitated, undesirable levels of manganese may also be precipitated from second liquid phases that contain manganese chlorides. However, for some applications, a mixture of iron oxides and manganese oxides is desirable.

When the iron-containing compounds that have been oxidized, neutralized and precipitated also contain manganese, they may, for example, be a mixture of iron and manganese oxides, oxy-hydroxides or hydroxides. Generation of these mixtures may be achieved by neutralization at a pH from about pH 4.5 to about pH 6.8 with aeration or, if the hydroxides are required, without aeration at a weakly alkaline pH. One may blend this precipitate with iron oxy-hydroxides and from this, generate magnetic ferrite materials.

The residual liquid phase will contain the iron (II) chloride that does not form part of the iron-containing compound, as well as other substances that are not precipitated. These other substances may include for example, manganese chlorides and magnesium chlorides.

Useful manganese-containing compounds, as well as other metal-containing compounds, may also be obtained from the residual liquid phase. For example, a manganese-containing compound may be obtained by adding sodium carbonate to the residual liquid phase. The sodium carbonate will force the precipitation of a manganese-containing compound. This manganese-containing compound may be recovered and processed to form a useable product via methods that are now known or that come to be known by persons skilled in the art for processing manganese-containing compounds via precipitation from manganese chloride solutions. Similarly, ammonium carbonate may be used.

Under a second embodiment, which is referred to as the parallel process, the liquid slurry stream is divided into two separate slurry streams, a first slurry stream and a second slurry stream. Under this embodiment, the first slurry stream is processed both to remove calcium compounds and to generate an agent that may be used to treat the second slurry stream, which may then be processed for waste water disposal or to generate iron-containing compounds.

Under the basic steps of this embodiment, when the liquid slurry stream is divided into a first slurry stream and a second slurry stream, the first slurry stream and the second slurry stream both contain iron (II) chloride. In this process, the split of the liquid slurry stream may be determined according to the relative proportions of iron in relationship to the substances that will be precipitated by a metal hydroxide-containing precipitate. Thus, if the liquid slurry stream is derived from a high grade titanium source, then the ratio of iron to aluminum will reduce, and more liquid will need to enter the first slurry stream. In practice, typically one may divide it into a split of from about 15% to about 20% by volume in the first slurry stream and the remainder entering the second slurry stream.

The first slurry stream is combined with a neutralization and precipitation agent. For economic reasons, this neutralization and precipitation will preferably be through the use of a calcium-containing neutralization agent that forms a metal hydroxide-containing precipitate and calcium chloride-containing liquid phase. The phrase "metal hydroxide-containing precipitate" refers to the substances that are precipitated by the addition of the calcium-containing neutralization agent to the first slurry stream. Preferably, the addition is sufficient to generate a metal hydroxide-containing precipitate that is comprised of the metal hydroxides of metals that precipitate in an environment that has a pH from about pH 7 to about pH 9. Because of the change in pH, weaker alkalis are less desirable. Most preferably, the metal hydroxide-containing precipitate will contain iron hydroxide and manganese hydroxide. As a matter of practicality, the metal hydroxide-containing precipitate will often contain some calcium. The phrase "calcium-containing liquid phase" refers to the substances of the first slurry stream that are not precipitated and includes calcium ions.

The metal hydroxide-containing precipitate is then used to neutralize the second slurry stream. The complete separation of the metal hydroxide-containing precipitate from the calcium-containing liquid phase is not economically feasible. Consequently, typically a small portion of the calcium-containing liquid phase will remain with the metal hydroxide-containing precipitate; the portion of the calcium-containing liquid phase that is added with the metal hydroxide-containing liquid phase is referred to herein as "a minority of said calcium chloride-containing liquid phase." To minimize the calcium content associated with the metal hydroxide phase, the separation step will ideally result in a high solids cake, the upper limit being determined by the ability to re-slurry in subsequent processing. Methods for recovery of solids cakes and their use for re-slurrying are well known to persons skilled in the art. Similarly, the amount of liquid in the minority of said calcium-containing liquid phase that is desirable for any particular application of the present invention will also be readily determinable by one skilled in the art upon reading this disclosure.

The addition of the metal hydroxide-containing precipitate and minority of said calcium chloride-containing liquid phase to said second slurry stream, will function as the addition of the initial neutralization agent to the liquid slurry stream functioned in the series process described above. Thus, the addition of the metal hydroxide-containing precipitate and the minority of the calcium chloride-containing liquid phase to the second slurry stream will generate the first precipitate and first liquid phase described above. Because the metal hydroxide-containing precipitate will often contain some calcium, the second precipitate formed if an optional sulfate-containing material has been added during this parallel process will contain some gypsum. The optional addition of the sulfate-containing material during the parallel process is discussed more fully below.

The first precipitate and the first liquid phase may then be separated, and the first liquid phase may be subjected to alkali and air in order to generate the iron-containing compounds and the residual liquid phase. The methods described above for the series process for generating the iron-containing compounds and manganese-containing compounds via oxidation, neutralization and precipitation are also applicable for the parallel process. However, because the agent used to neutralize the second slurry stream contains only a limited amount of calcium, the amount of gypsum produced will be relatively small when compared to the series method.

In the first precipitate, there will typically be some iron. In order for the parallel process to be economical, preferably at least about 80% of the iron-compounds will enter the first liquid phase.

Unlike in the series process described above, in the parallel process, it is not essential to use a sulfate-containing compound because there is less calcium to remove. In fact, the use of a washing step during the separation of the metal hydroxide containing precipitate from the calcium chloride liquor may reduce the residual calcium to a level acceptable in the downstream processing.

However, although for many applications, it is not necessary to neutralize with a sulfate-containing compound during the parallel process, one may flexibly incorporate the use of sulfate-containing compounds and thereby remove calcium and generate gypsum. Following any addition of the sulfate-containing compound, the resulting precipitate will preferably be filtered before any subsequent processing steps. Methods for filtration are well known to persons skilled in the art.

For example, the sulfate-containing compound may be added after the formation of the metal hydroxide-containing precipitate and the calcium chloride-containing liquid phase prior to separation of the majority of the calcium chloride containing liquid phase from the metal hydroxide-containing precipitate and minority portion of the calcium chloride-containing precipitate.

Figure 2:
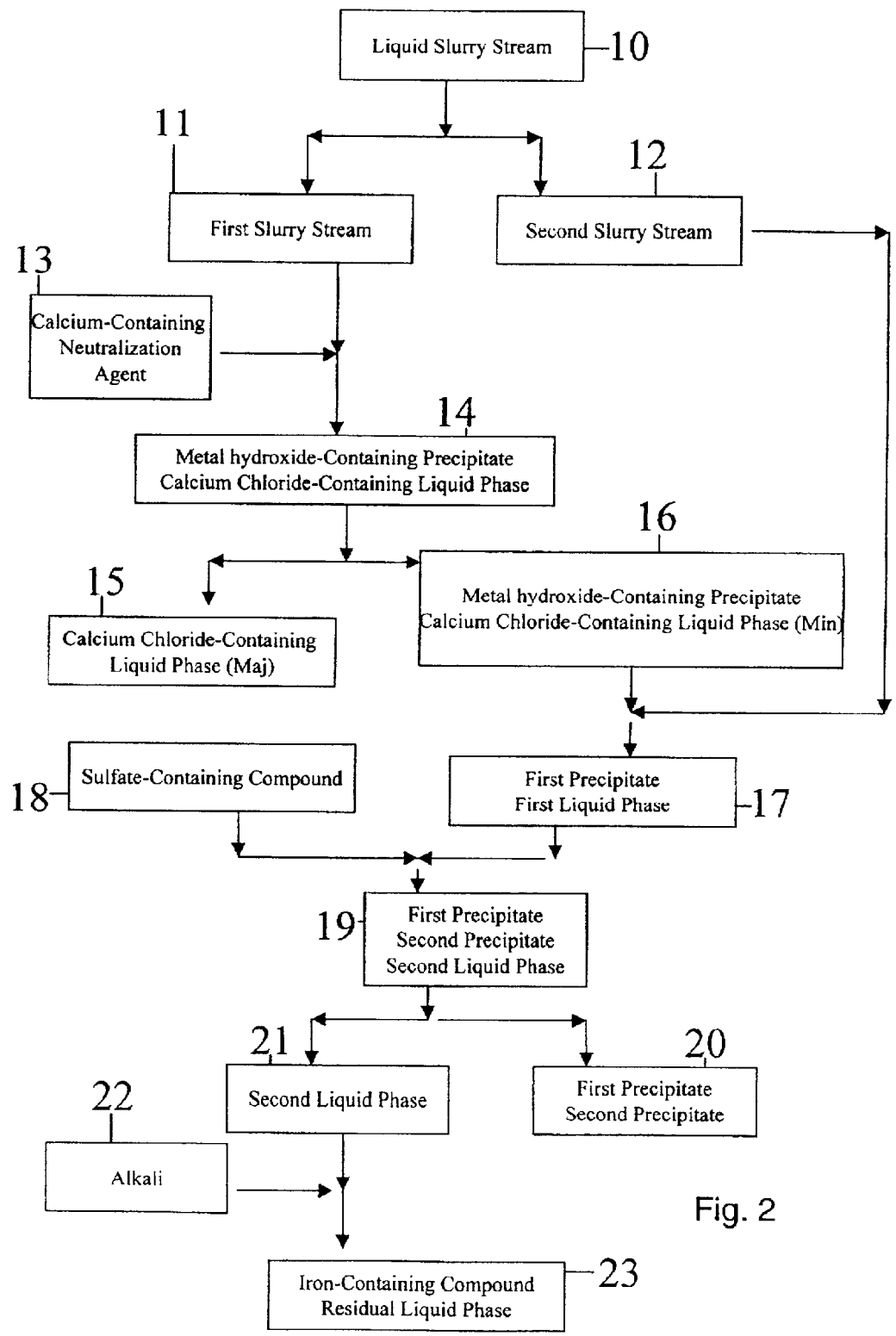
FIG. 2 is a representation of an example of the parallel process for producing iron-containing compounds.

The sulfate-containing compound may also be added to the first precipitate and first liquid phase. This sub-embodiment of the parallel process is depicted in FIG. 2. In this process, the liquid slurry stream, 10, is initially divided into a first slurry stream, 11 and a second slurry stream, 12.

A calcium-containing neutralization agent, 13, is added to the first slurry stream to form a metal hydroxide-containing precipitate and a calcium-containing liquid phase, 14. The metal hydroxide-containing precipitate is separated from the majority of the calcium-containing liquid phase, 15. Typically a small portion of the calcium-containing liquid phase will remain with the metal hydroxide-containing precipitate, 16. This small portion is the "minority of the calcium-containing liquid phase" described above.

The addition of the metal hydroxide-containing precipitate and minority of said calcium chloride-containing liquid phase, 16, to said second slurry stream, 12, will function as the addition of the initial neutralization agent to the liquid slurry stream functioned in the series process described above. Thus, the addition of the metal hydroxide-containing precipitate and the minority of the calcium chloride-containing liquid phase to the second slurry stream will generate the first precipitate and first liquid phase described above, 17.

The first liquid phase and the first precipitate of the parallel process may then be subjected to the same steps that were described above in series process for generating an iron-containing compound 17–23 of FIG. 2, which are the same as 3–9 of FIG. 1. In this sub-embodiment, the addition of the sulfate-containing compound, 18 to the first precipitate and first liquid phase, 17, yields a combination of the first precipitate, the second precipitate, which would contain gypsum, and second liquid phase, 19. Following this addition there is a filtration step to separate the second liquid phase, 21, from the first precipitate and second precipitate, 20. The second liquid phase may then be treated with alkali, 22, to form the iron-containing compound and residual liquid phase, 23. As described above, one may also recover manganese-containing compounds.

According to another sub-embodiment of the parallel process the sulfate-containing compound may be added to the first liquid phase after the first liquid phase has been separated from the first precipitate. In this sub-embodiment, after the first liquid phase has been combined with the sulfate-containing compound, gypsum will be formed. The gypsum will then be filtered and the remaining liquid may be further process, by oxidation, neutralization and precipitation to form the iron containing compound and the residual liquid phase. The form and retrieval of these iron-containing compounds may be controlled by the methods described above in the context of the series process for controlling the form and retrieval of iron-containing compounds.

Under a third embodiment, the recycle process, the liquid slurry stream is neutralized by an initial neutralization agent that has been recycled from the processing of waste from a liquid slurry stream.

Under this recycle process, an initial neutralization agent is added to a liquid slurry stream as described above in the series process, to form a first precipitate and a first liquid phase. The first precipitate is preferably separated from the first liquid phase following the addition of the initial neutralization agent.

Under this embodiment, the first liquid phase is divided into a first solution and a second solution. The amount of the first liquid phase that becomes part of the first solution as opposed to the second solution will depend on the concentration of the incoming stream. However, in a typical stream concentration, it may for example, be useful to for the first solution to contain approximately 40% of the first liquid phase. The percentage would be smaller for stronger feedstock and greater for more dilute feedstock.

For reasons of economics, a neutralization agent that is preferably a calcium-containing neutralization agent, is added to the first solution to form a metal hydroxide-containing precipitate and a calcium chloride-containing liquid phase. As with the calcium-containing neutralization agent described above in the parallel process, this calcium-containing substance is preferably calcium hydroxide, calcium oxide, or calcium carbonate or a mixture of any two or all three of the aforementioned substances. Similarly, the metal hydroxide-containing precipitate and the calcium-containing liquid phase will be defined by the same parameters as were described above in the description of the parallel process.

The majority of the calcium-containing liquid phase will be removed, and the metal hydroxide-containing precipitate and a minority of the calcium chloride-containing liquid phase are subsequently used as the initial neutralization agent. This recycled initial neutralization agent may be used to neutralize a liquid slurry stream to generate another first precipitate and first liquid phase. After the first precipitate is removed, this first liquid phase may be separated into a first solution and a second solution as described above. The second solution may then be the subject to an oxidation, neutralization and precipitation process to generate an iron-containing compound and a residual liquid phase. The methods described above for the series process for generating the iron-containing compounds and manganese-containing compounds via oxidation, neutralization and precipitation are also applicable for the recycle process.

As with the parallel process, the recycle process does not essentially require the use of a sulfate-containing compound. However, also as with the parallel process, one may flexibly incorporate sulfate addition into the recycle process and generate gypsum, and consideration of a washing step may also be given as previously discussed.

For example, in one sub-embodiment of the recycle process, the sulfate-containing compound may be added immediately after the initial neutralization and prior to the separation of the first precipitate from the first liquid phase. Immediately following this addition, there would be filtration of the precipitate that was generated. In a second sub-embodiment of the recycle process, the sulfate containing-compound may be added after the separation of the first precipitate from the first liquid phase but prior to the separation of the first liquid phase into the first solution and the second solution. Again, following addition of the sulfate-containing compound there would be filtration. In a third sub-embodiment, the sulfate-containing compound may be added to the metal hydroxide-containing precipitate and calcium chloride-containing liquid phase prior to the separation of the majority of the calcium chloride-containing liquid phase. As with all other additions of the sulfate-containing compound, following its addition at this point, there would be filtration.

Figure 3:
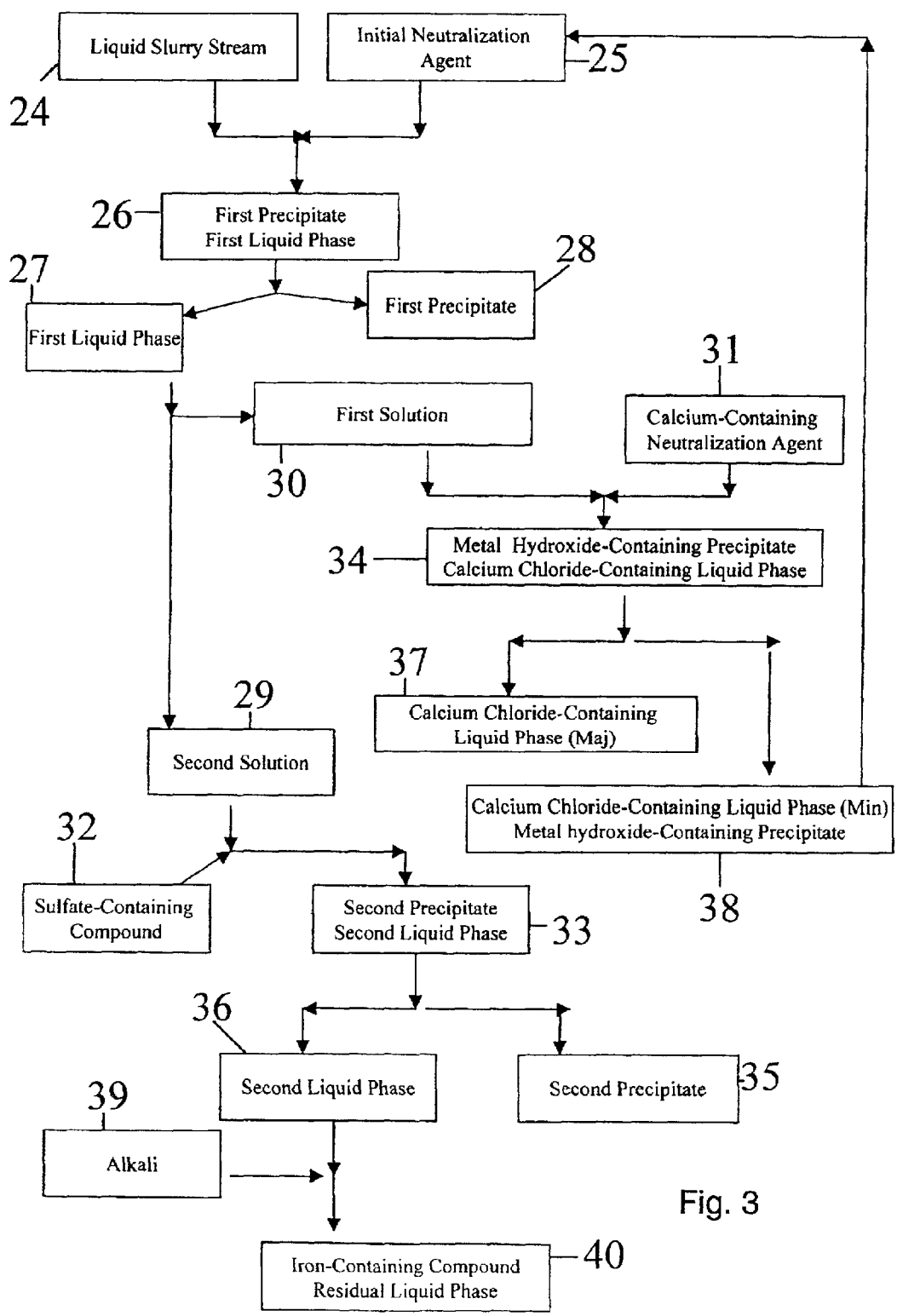
FIG. 3 is a representation of an example of the recycle process for producing iron-containing compounds.

In a fourth sub-embodiment, the sulfate-containing compound may be added to the second solution. This sub-embodiment is represented in FIG. 3. In this sub-embodiment, an initial neutralization agent, 25 is added to a liquid slurry stream, 24, as described above in the series process to form a first precipitate and a first liquid phase, 26. The first precipitate may be separated from the first liquid phase, 27. Under this sub-embodiment, the first liquid phase is divided into a first solution, 30, and a second solution, 29.

The first solution is then treated with the calcium-containing neutralization agent, 31, to form the metal hydroxide-containing precipitate and the calcium chloride-containing liquid phase, 34. The majority of the calcium-containing liquid phase will be removed, 37, and the metal hydroxide-containing precipitate and a minority of the calcium chloride-containing liquid phase, 38, are subsequently recycled and used as the initial neutralization agent, 25

A sulfate-containing compound, 32, may be combined with the second solution, 29, in order to form the second precipitate and second liquid phase, 33. The second liquid phase may then be processed as is described above for the processing of the second liquid phase in the series process to obtain the iron-containing compounds and manganese-containing compounds, 36, 39 and 40 of FIG. 3, which correspond to 7–9 of FIG. 1. That is, the second liquid phase and second precipitate may be separated, 35 and 36. The second liquid phase may then be oxidized, neutralized and precipitated by alkali, 39, to form the iron-containing compound and residual liquid phase, 40. The form and retrieval of these iron-containing compounds may be controlled by the methods described above in the context of the series process for controlling the form and retrieval of iron-containing compounds.

One benefit of this fourth sub-embodiment is that the amount of sulfate-containing compound that is added may be easily determined depending on how much gypsum is desired.

Iron-containing compounds obtained by the above-referenced processes may be treated by methods known to persons skilled in the art to prepare iron oxide pigments or ferrites.

EXAMPLES

The following examples set forth preferred embodiments of the invention. These embodiments are merely illustrative and are not intended and should not be construed to limit the claimed invention in any way.

Examples 1–3

The Starting Material Samples

Samples were taken of the waste stream from the fluid bed chlorination stage of a chloride $TiO_2$ process, which was chlorinating Richards Bay Minerals slag. The slag contained 86.5 wt. % $TiO_2$, 10.0 wt. % FeO, 1.7 wt. % MnO, 1.0 wt. % MgO, 0.16 wt. % CaO, 0.15 wt. % $Cr_2O_3$, 0.45 wt. % $V_2O_5$, 1.5 wt. % $Al_2O_3$, 0.12 wt. % $Nb_2O_5$, 0.3 wt. % $ZrO_2$, and 1.9 wt. % $SiO_2$, with traces of other impurities. When the slag was chlorinated with chlorine and petroleum coke at over 1000 degrees Centigrade, with no unreacted chlorine passing through the fluid bed, virtually all of its components were converted into their corresponding chlorides or oxychlorides. A small amount of the material of the slag escaped as small particles known as blowover. These small particles, along with the gasses and vapors from the fluid bed were taken without further addition of chlorine so as to maintain the iron chloride in the divalent state, and were cooled and conducted to a cyclone separator operating at 260 degrees Centigrade, so that the $TiCl_4$ was above its dew point and did not condense therein. The cyclone separator collected the materials that are solid at that temperature, such as unreacted slag and coke blowover and some silica and zirconia, and the chlorides of iron, manganese, magnesium, calcium, chromium, and other involatile compounds. Solids that by-passed the cyclone separator with the $TiCl_4$-containing gas stream were separated from the $TiCl_4$ at later stages of the process and recycled directly to the entry of the cyclone separator along with solidified compounds of aluminum, vanadium, zirconium, and other impurities, so that it effectively separated all of these materials from the $TiCl_4$-containing gaseous stream.

These materials passed from the base of the separator, along with a very small amount of $TiCl_4$, and were lixiviated in a water-containing stream with agitation, the sensible heat of the solids and their heat of solution being sufficient to raise the temperature to around 70 degrees Centigrade but not to cause boiling. The slurry formed at this stage, containing solids in suspension and salts in solution, was passed through a pair of hydrocyclone separators to separate the coarser re-usable slag and coke blowover particles for further separation, washing, and drying for recycle to the chlorination stage. The washings returned to the lixiviation stage. The remaining slurry formed the feed to the waste treatment process, and it was this stream that was sampled. (the "Starting Material Sample") At this point, the temperature had fallen to 50 degrees Centigrade.

The slurry was found to be made up of 12 to 15 wt. % fine solids in aqueous suspension and otherwise a solution containing 31% salts, of specific gravity 1.27, and containing 110 to 125 g/l iron all in the divalent state, with other soluble metal values from the slag in proportion.

Example 1
Simple Series Process Neutralization

Portions of the Starting Material Sample were taken without further treatment and neutralized with a calcium-containing neutralizing agent being either slaked lime or finely divided calcium carbonate in the form of aragonite. In each case the neutralizing agent was added in the form of a 22 wt. % aqueous slurry.

It was found by analysis that after only a very small addition of neutralizing agent, the niobium, titanium, and zirconium and other very minor impurity values were fully precipitated, and that when 0.55 grams of lime per gram of iron contained in the slurry sample were added, or the equivalent amount of aragonite, the vanadium, chromium, and aluminum values were also fully precipitated. At this stage the slurry itself registered pH 4 and after separation of the precipitated materials this was somewhat lower at pH 2.4. The iron, all in the divalent state, the manganese, magnesium, and the calcium values remained in solution.

Filtration rates were measured and it was found that these were acceptable, especially if the agitation were slow. An aliquot of 500 mls of the starting sample treated in this way with a neutralizing agent addition time of one minute and a holding time of five minutes gave 10.3 minutes filtration time and 45 minutes filtration and washing time, using a 185 mm diameter Buchner funnel and two Whatman No. 541 filter papers, washing with two times 200 mls water.

The recovered filtrate forms the liquid phase for further treatment stages for iron oxide recovery.

The filter cake, unwanted amounts of filtrate, and other residual liquids from later stages were collected together and neutralized to pH 8.5 to precipitate the remaining metals and this was in turn filtered to produce a brine filtrate and form a de-acidified cake for disposal.

Calcium Removal (A) The liquid phase obtained after the separation of the precipitate of the series process was used as the starting point for this experiment. The solution contained the chlorides of the elements Fe(II), Mn, Ca, and Mg as shown:

Fe 67.0 g/l;
Mn 13.8 g/l;
Ca 11.0 g/l; and
Mg 7.76 g/l.

3 liters of this solution was treated with the stoichiometric amount of 238 g of $FeSO_4 \cdot 7H_2O$ without heating and stirred and allowed to settle overnight. The precipitated gypsum was separated and the remaining solution analyzed:

Fe 83.0 g/l;
Mn 13.3 g/l;
Ca 2.36 g/l; and
Mg 7.6 g/l.

It was also found that if 120% of the stoichiometric amount of $FeSO_4 \cdot 7H_2O$ was added, after 30 minutes essentially 100% of the calcium was precipitated.

(B) At another time, the liquid phase obtained after the separation of the precipitate of the series process operating with a slightly less concentrated solution was used for this step:

Fe 52.2 g/l;
Mn 10.90 g/l;
Ca 11.6 g/l; and
Mg 6.17 g/l.

On this occasion, 1.5 liters of this solution were mixed with 0.392 liters of 163 g/l $Na_2SO_4$ solution and stirred with no additional heat added until precipitate ceased to form. The precipitate was filtered off and the filtrate recovered for further processing to iron oxy-hydroxide (hydrated iron oxide). The solution contained:

Fe 54.7 g/l;
Mn 10.4 g/l;
Ca 2.66 g/l; and
Mg 5.7 g/l.

Preparation of Goethite from the Series Process

Goethite particles were prepared from solutions obtained via the above described series process. First a seed was prepared. Second the seed was used to obtain the Goethite particles.

Preparation of Goethite Seed

A tenth of a liter of 20% with water NaOH solution was added with continuous agitation to one liter of 10% with water $FeSO_4$ solution whilst air was bubbled through the mixture at 1 liter/min such that the pH of the mixture was in the range pH 6 to pH 8. The temperature of the mixture was maintained at 35 to 40 degrees Centigrade. After 4 hours, the oxidation was complete. A small portion of the seed slurry was centrifuged and washed with de-mineralized water then dried at 80 degrees Centigrade, and the solids were examined by X-ray diffraction. The phases present were mainly Goethite with a small amount of Lepidocrocite. The concentration of the seed suspension was 20.2 grams of FeOOH per liter.

Preparation of Goethite Particles

The solution obtained after the series neutralization of the starting sample followed by the calcium removal step was taken and diluted to contain 35 g/l Fe. 1.2 liters of this was mixed with 0.165 liters of the above Goethite primary seed suspension containing 3.3 g of FeOOH, which is equivalent to 10% of the expected FeOOH product after oxidation and neutralization of the feed solution.

A quantity of neutralizing agent, 15.5% with water $Na_2CO_3$ solution, was chosen so that half of the iron present in the feed solution would be neutralized. The mixture was heated to 70 degrees Centigrade then 244 g of the 15.5% $Na_2CO_3$ solution was transferred at the same time as air was bubbled through the mixture at 3 liters/min, at such a rate that the pH was maintained in the range 3.5 to 4.5. After the addition was complete, the mixture was held for 20 hours at 70 to 80 degrees Centigrade with the air bubbling. The slurry was cooled to 45 deg C. then filtered under vacuum and the retained cake was washed with de-mineralized water and dried at 80 degrees C. in an oven. X-ray diffraction showed the solids to be Goethite.

The color of the solids was yellow. Color measurement by the CIE 1976 Lab system on a dry block gave the values:

'L*' value 63
'a*' value 5.7
'b*' value 45.3

The surface area by BET $N_2$ adsorption was 40 m squared per gram.

A portion was heated to convert it to Haematite, $Fe_2O_3$, and analyzed to be $Fe_2O_3$ 99.17% and MnO 0.56%.

As a comparison the process was carried out again except that in this case the calcium removal step was omitted and 5% instead of 10% primary seed addition was used. Again X-ray diffraction showed the solids to be Goethite, and the color was yellow, dry block color measurements gave the values:

'L*' value 56.14
'a*' value 5.47
'b*' value 33.71 indicating less intense and less bright color.

The surface area by BET $N_2$ adsorption was 32 m squared per gram as less seed had been used.

A portion was heated to convert it to Haematite, $Fe_2O_3$, and analyzed to be $Fe_2O_3$ 99.13% and MnO 0.7%.

Preparation of Lepidocrocite from the Series Process

Lepidocrocite particles were prepared from solutions obtained via the above described series process. First a seed was prepared. Second the seed was used to obtain the Lepidocrocite particles.

Preparation of Lepidocrocite Seed

One liter of reagent grade iron dichloride solution containing 20 g/l of Fe was agitated at room temperature in a 2.5 liter capacity beaker. Air was bubbled through the solution at 0.4 l/min and 0.7 liters of 20 g/l NaOH solution was added so as to maintain the pH in the range 6.6 to 7.0. The time of addition was 170 minutes. The contents changed from a dark green solution to an orange slurry. The mixture was agitated with air bubbling for a further 30 minutes maintaining the pH in the range of pH 6.3 to pH 6.6 by manipulation of the air rate and the addition of small amounts of NaOH solution.

A small portion of the slurry was centrifuged and the solids were washed with de-mineralized water and dried at 80 deg Centigrade, and its spectrum showed that the material was Lepidocrocite with a very small amount of Goethite present. The concentration of FeOOH was measured to be 18.7 g/l. The surface area was measured by BET $N_2$ adsorption to be 69.4 m squared per gram.

Preparation of Lepidocrocite Particles (A) The same solution of iron dichloride after the series process with removal of calcium as was used to make the Goethite particles in an earlier example was used. One liter of this solution was mixed with 0.4 liter of the above Lepidocrocite primary seed suspension, equivalent to an addition of 15% seed. Air was bubbled through at 3 l/min with the mixture at 45 deg Centigrade. 385 g of 15.5% $Na_2CO_3$ solution was added so that the pH of the mixture was maintained in the range 3.5 to 4.5. The mixture was held for two hours.

The slurry was cooled and filtered and washed on the filter. The light orange colored solids were found to be Lepidocrocite of particle size 500–600 nm×100 nm. The surface area by BET $N_2$ adsorption was 19 m squared per gram.

A portion was heated to convert it to Haematite and analyzed to be 99.97% $Fe_2O_3$ and 0.03% MnO.

(B) Forty liters of iron dichloride solution made by the recycle process and containing 63.3 g/l Fe was mixed with 10% Lepidocrocite primary seed and while at 45 deg Centigrade air was bubbled through it at 40 l/min and 21.3 liters of 15.5% $Na_2CO_3$ solution was added so as to maintain the pH of the mixture between pH 3.5 to pH 4.5. After this addition was complete the mixture was held for an hour. It was then diluted with an equal volume of water and stored for use as a secondary seed.

Fifty liters of the same 63.3 g/l Fe iron dichloride solution was mixed with 5% primary seed. Air was bubbled through at 45 deg Centigrade, and 8 liters of secondary seed was added, then 26.6 liters of 15.5% $Na_2CO_3$ solution was added at such a rate as to maintain the pH in the range pH 3.5 to pH 4.5. At the end of this time the mixture was held for an hour with air bubbling. It was then filtered and the cake washed with five times 5 liters of hot water. The cake was dried at 80 deg Centigrade.

The light orange colored material had the dry block color values:

'L*' value 63.4
'a*' value 19.8
'b*' value 52.6 and the surface area by BET $N_2$ adsorption was 21.1 m squared per gram. The structure was Lepidocrocite with a trace of Goethite.

A portion was heated to convert it to Haematite and analyzed as 99.19% $Fe_2O_3$, and 0.11% MnO.

Preparation of Akaganeite

Fifty liters of a solution of iron dichloride made by the series process above and containing 56 g/l Fe was agitated at room temperature with 40 liters/min air bubbling, while 14.3 liters of 15.5% $Na_2CO_3$ solution was added at such a rate to maintain the pH in the range pH 3.5 to pH 4.5. No seed was added. The mixture was held for a further 30 minutes, then filtered washed and dried at 80 deg Centigrade. The material was found to be Akaganeite with surface area 115 m squared per gram. One gram was accurately weighed out and dissolved in 50 mls of 18% sulfuric acid and the solution analyzed, which indicated the solids contained 64.78% Fe and 0.05% Mn expressed on the dried solids.

A portion was heated to convert it to Haematite and analyzed to be 98.99% $Fe_2O_3$, 0.2% MnO, 0.14% $TiO_2$, 0.06% CaO, 0.33% $SiO_2$, and 0.22% $Al_2O_3$.

Preparation of Magnetite

Approximately 250 mls of iron dichloride solution made as above and with 70 g/l Fe content was agitated without additional heat and while 1 liter/min air was bubbled through it 1 Molar NaOH solution was added so as to maintain the pH in the range pH 8.0 to pH 8.5 until no further change took place, then the mixture was held for a further half hour. No seed was added. The solids were filtered off and washed and dried as in previous examples. The black colored material was found to be Magnetite.

Recovery of Manganese Values

The liquid remaining after the recovery of the iron values was titrated with an aqueous solution of 15.5% $Na_2CO_3$ without further heating over several hours, and a precipitate was observed to form and slowly settle. This was filtered off and ashed at 900 deg C. and found to contain manganese oxide with less than 10% of other impurities.

Example 2
Parallel Process Neutralization

Another portion of the Starting Material Sample was taken without further treatment and divided into two parts, such that an aliquot of a fifth of it was used to prepare a neutralizing agent with which to treat the remainder. The preparation steps follow:

Slaked lime in the form of a 22% with water slurry was added with moderate agitation without further heating being applied to the aliquot, until a pH of 6.4 was registered. Analysis at this point showed that 99.8% of the iron values bad been precipitated as iron (II) hydroxide, and 64% of the magnesium values and 82% of the manganese values had been precipitated. Adding further lime slurry until a pH of 8 was registered resulted in 100% of the iron values, 75% of the magnesium values, and 95% of the manganese values being precipitated as their hydroxides.

The precipitate was recovered by filtration, and washed on the filter with water. It was then mixed into the remainder of the portion of starting material sample, with the speed of agitation controlled so as to be initially sufficiently high to blend the mixture and then reduced so as to allow flocculants of the precipitate formed at this stage of the process to form. The pH of the mixture was found to be 3.5 at which pH the iron and manganese values redissolve.

The precipitate was removed from the liquid phase by filtration and the liquid was found to contain:

Fe 119 g/l;
Mn 23 g/l;
Ca 7.9 g/l; and
Mg 11.9 g/l.

Example 3
Recycle Process Neutralization

A portion of the Starting Material Sample was mixed with a sufficient amount of the second stage filter cake so as to give a pH of 4.3, flocc were formed and separated from the liquor, which was sampled.

This filter cake could be washed with water or fed back unwashed.

In an instance where the second stage cake was fed back unwashed, the sampled liquor, which forms the feed to the iron oxide recovery step, was found to contain:

Fe 101 g/l;
Mn 23.8 g/l;
Ca 5 g/l; and
Mg 7 g/l.

In a further instance where the second stage cake was fed back washed, the sampled liquor was found to contain:

Fe 95.4 g/l;
Mn 24.5 g/l;
Ca 2 g/l; and
Mg 7 g/l.

Having thus described and exemplified the invention with a certain degree of particularity, it should be appreciated that the following claims are not to be so limited but are to be afforded a scope commensurate with the wording of each element of the claim and equivalents thereof.

What is claimed:

1. A process for treating iron-containing waste streams in which an iron-containing compound is produced from a liquid slurry stream, said process comprises the steps of:
   (a) adding an initial neutralization agent to a liquid slurry stream to form a first precipitate and a first liquid phase, wherein said liquid slurry stream comprises iron (II) chloride;
   (b) combining said first liquid phase and a sulfate-containing compound to form a second precipitate and a second liquid phase, wherein said second precipitate comprises gypsum and said second liquid phase comprises iron (II) chloride;
   (c) separating said second precipitate from said second liquid phase; and
   (d) subjecting said second liquid phase to an oxidation, neutralization and precipitation process to form an iron-containing compound and a residual liquid phase.

2. The process according to claim 1, wherein said liquid slurry stream is formed by chlorinating an iron-containing substance.

3. The process according to claim 2, further comprising chlorinating a titanium-containing substance.

4. The process according to claim 1, wherein said liquid slurry stream further comprises at least one metal chloride selected from the group consisting of chlorides of manganese, chromium, vanadium, aluminum, niobium, magnesium, calcium, silicon and zirconium.

5. The process according to claim 1, wherein said initial neutralization agent is a calcium-containing neutralization agent.

6. The process according to claim 5, wherein said initial neutralization agent is selected from the group consisting of calcium hydroxide, calcium oxide, calcium carbonate and mixtures thereof.

7. The process according to claim 1, wherein said adding of said initial neutralization agent changes the pH of the liquid slurry stream to a pH between about pH 4.0 and about pH 4.5.

8. The process according to claim 1, wherein said first precipitate is not separated from said first liquid phase prior to step (b).

9. The process according to claim 1, wherein said first precipitate is separated from said first liquid phase prior to the combining of the first liquid phase with the sulfate-containing compound.

10. The process according to claim 1, wherein said sulfate-containing compound is selected from the group consisting of ammonium sulfate, iron sulfate, sodium sulfate and mixtures thereof.

11. The process according to claim 1, wherein said iron-containing compound is selected from the group consisting of α-FeO(OH), β-FeO(OH), γ-FeO(OH) and combinations thereof.

12. The process according to claim 1 further comprising isolating a manganese-containing compound from said residual liquid phase.

13. The process according to claim 12, wherein said isolating comprises adding sodium carbonate or ammonium carbonate to said residual liquid phase.

14. The process according to claim 1, wherein said liquid slurry stream further comprises at least one metal oxychloride selected from the group consisting of oxychlorides of manganese, chromium, vanadium, aluminum, niobium, magnesium, calcium, silicon and zirconium.

15. A process for treating iron-containing waste streams in which an iron-containing compound is produced from a liquid slurry stream, said process comprises the steps of:

(a) dividing a liquid slurry stream into a first slurry stream and a second slurry stream, wherein said liquid slurry stream comprises iron (II) chloride;

(b) adding a calcium-containing neutralization agent to said first slurry stream to form a metal hydroxide-containing precipitate and a calcium chloride-containing liquid phase;

(c) separating a majority of said calcium chloride-containing liquid phase from the metal hydroxide-containing precipitate and a minority of said calcium chloride-containing liquid phase;

(d) adding said metal hydroxide-containing precipitate and said minority of said calcium chloride-containing liquid phase to said second slurry stream to form a first precipitate and a first liquid phase;

(e) separating said first precipitate from said first liquid phase; and (f) subjecting said first liquid phase to an oxidation, neutralization and precipitation process to form an iron-containing compound and a residual liquid phase.

16. The process according to claim 15, wherein a sulfate-containing compound is added to said metal hydroxide-containing precipitate and said calcium chloride containing liquid chase of step (b) after the formation of the metal hydroxide-containing precipitate but prior to step (c) to form gypsum.

17. The process according to claim 15, wherein said liquid slurry stream further comprises at least one metal oxychloride selected from the group consisting of oxychlorides of manganese, chromium, vanadium, aluminum, niobium, magnesium, calcium, silicon and zirconium.

18. The process according to claim 15, wherein said metal hydroxide-containing precipitate is capable of precipitating in an environment of from about pH 7 to about pH 9.

19. The process according to claim 15, wherein said liquid slurry stream is formed by chlorinating an iron-containing substance.

20. The process according to claim 15, further comprising chlorinating a titanium-containing substance.

21. The process according to claim 15, wherein said liquid slurry stream further comprises at least one metal chloride selected from the group consisting of chlorides of manganese, chromium, vanadium, aluminum, niobium, magnesium, calcium, silicon and zirconium.

22. The process according to claim 15, wherein said calcium-containing neutralization agent is selected from the group consisting of calcium hydroxide, calcium oxide, calcium carbonate and mixtures thereof.

23. The process according to claim 15, wherein said adding of said calcium-containing neutralization agent changes the pH of said first slurry stream to a pH between about pH 4.0 and about pH 4.5.

24. The process according to claim 15, wherein from about 50 weight % to about 80 weight % of the iron (II) chloride present in step (c) is oxidized, neutralized and precipitated to form said iron-containing compound.

25. The process according to claim 15, wherein said iron-containing compound is selected from the group consisting of $\alpha$-FeO(OH), $\beta$-FeO(OH), $\gamma$-FeO(OH) and combinations thereof.

26. The process according to claim 15, further comprising isolating a manganese-containing compound from said residual liquid phase.

27. The process according to claim 26, wherein said isolating comprises adding sodium carbonate or ammonium carbonate to said residual liquid phase.

28. A process for treating an iron-containing waste stream, said process comprises the steps of:

(a) adding an initial neutralization agent to a liquid slurry stream to form a first precipitate and a first liquid phase, wherein said liquid slurry stream comprises an iron (II) chloride;

(b) dividing said first liquid phase into a first solution and a second solution;

(c) adding a calcium-containing neutralization agent to said first solution to form a metal hydroxide-containing precipitate and a calcium chloride-containing liquid phase;

(d) using said metal hydroxide-containing precipitate and a minority of said calcium-chloride containing liquid phase as said initial neutralization agent; and (e) subjecting said second solution to an oxidation, neutralization and precipitation process to form an iron-containing compound and a residual liquid phase.

29. A process for treating an iron-containing waste stream according to claim 28, further comprising adding a sulfate-containing compound to said first precipitate and said first liquid phase prior to step (b) to form gypsum.

30. A process for treating an iron-containing waste stream according to claim 28, further comprising adding a sulfate-containing compound to said second solution after step (b).

31. The process according to claim 28, wherein said liquid slurry stream further comprises at least one metal oxychloride selected from the group consisting of oxychlorides of manganese, chromium, vanadium, aluminum, niobium, magnesium, calcium, silicon, and zirconium.

32. A process for treating an iron-containing waste stream according to claim 28, further comprising adding a sulfate-containing compound to the metal hydroxide-containing compound and calcium chloride containing liquid phase of step (c).

33. The process according to claim 28, wherein said metal hydroxide-containing precipitate is capable of precipitating in an environment of from about pH 7 to about pH 9.

34. The process according to claim 28, wherein said liquid slurry stream is formed by chlorinating an iron-containing substance.

35. The process according to claim 28, further comprising chlorinating a titanium-containing substance.

36. The process according to claim 28, wherein said liquid slurry stream further comprises at least one metal chloride selected from the group consisting of chlorides of manganese, chromium, vanadium, aluminum, niobium, magnesium, calcium, silicon and zirconium.

37. The process according to claim 28, wherein said calcium-containing neutralization agent is selected from the group consisting of calcium hydroxide, calcium oxide, calcium carbonate and mixtures thereof.

38. The process according to claim 28, wherein said adding of said initial neutralization agent changes the pH of the liquid slurry stream to a pH between about pH 4.0 and about pH 4.5.

39. The process according to claim 28, wherein said iron-containing compound is selected from the group consisting of $\alpha$-FeO(OH), $\beta$-FeO(OH), $\gamma$-FeO(OH) and combinations thereof.

40. The process according to claim 28, further comprising isolating a manganese-containing compound from said residual liquid phase.

41. The process according to claim 40, wherein said isolating comprises adding sodium carbonate or ammonium carbonate to said residual liquid phase.

42. A process for treating iron-containing waste streams in which an iron-containing compound is produced from a liquid slurry stream, said process comprises the steps of:

(a) dividing a liquid slurry stream into a first slurry stream and a second slurry stream, wherein said liquid slurry stream comprises iron (II) chloride;

(b) adding a calcium-containing neutralization agent to said first slurry stream to form a metal hydroxide-containing precipitate and a calcium chloride-containing liquid phase;

(c) separating a majority of said calcium chloride-containing liquid phase from the metal hydroxide-containing precipitate and a minority of said calcium chloride-containing liquid phase;

(d) adding said metal hydroxide-containing precipitate and said minority of said calcium chloride-containing liquid phase to said second slurry stream to form a first precipitate and a first liquid phase;

(e) separating said first precipitate from said first liquid phase;

(f) combining the first liquid phase of step (e) and a sulfate-containing compound to form a second precipitate and a second liquid phase, wherein said second liquid phase comprises iron (II) chloride and said second precipitate comprises gypsum;

(g) separating said second precipitate from said second liquid phase; and (h) subjecting said second liquid phase to an oxidation, neutralization and precipitation process to form an iron-containing compound.

43. A process for treating an iron-containing waste stream, said process comprises the steps of:

(a) adding an initial neutralization agent to a liquid slurry stream to form a first precipitate and a first liquid phase, wherein said liquid slurry stream comprises an iron (II) chloride;

(b) dividing said first liquid phase into a first solution and a second solution;

(c) adding a calcium-containing neutralization agent to said first solution to form a metal hydroxide-containing precipitate and a calcium chloride-containing liquid phase;

(d) using said metal hydroxide-containing precipitate and a minority of said calcium-chloride containing liquid phase as said initial neutralization agent;

(e) combining said second solution with a sulfate-containing compound to form a second precipitate and a second liquid phase, wherein said second liquid phase comprises iron (II) chloride and said second precipitate comprises gypsum;

(f) separating said second precipitate from said second liquid phase; and (g) subjecting said second liquid phase to an oxidation, neutralization and precipitation process to form an iron-containing compound and a residual liquid phase.

* * * * *